United States Patent
Borella et al.

(10) Patent No.: US 9,994,701 B2
(45) Date of Patent: Jun. 12, 2018

(54) MACROMER AND PROCESS FOR MAKING POLYMER POLYOLS

(71) Applicant: DOW GLOBAL TECHNOLOGIES LLC, Midland, MI (US)

(72) Inventors: Ricco B. Borella, Schindellegi (CH); Sven Claessens, Lokeren (BE); Jean-Paul Masy, Destlebergen (BE); Stijn De Loos, Clinge (NL)

(73) Assignee: Dow Global Technologies LLC, Midland, MI (US)

( * ) Notice: Subject to any disclaimer, the term of this patent is extended or adjusted under 35 U.S.C. 154(b) by 30 days.

(21) Appl. No.: 14/429,154

(22) PCT Filed: Sep. 23, 2013

(86) PCT No.: PCT/US2013/061255
§ 371 (c)(1),
(2) Date: Mar. 18, 2015

(87) PCT Pub. No.: WO2014/055282
PCT Pub. Date: Apr. 10, 2014

(65) Prior Publication Data
US 2015/0274952 A1    Oct. 1, 2015

Related U.S. Application Data

(60) Provisional application No. 61/710,127, filed on Oct. 5, 2012.

(51) Int. Cl.
| | | |
|---|---|---|
| *C08L 25/12* | (2006.01) | |
| *C08J 9/12* | (2006.01) | |
| *C08J 9/00* | (2006.01) | |
| *C08G 18/63* | (2006.01) | |
| *C08G 18/40* | (2006.01) | |
| *C08G 101/00* | (2006.01) | |

(52) U.S. Cl.
CPC .......... *C08L 25/12* (2013.01); *C08G 18/4072* (2013.01); *C08G 18/632* (2013.01); *C08G 18/636* (2013.01); *C08J 9/0061* (2013.01); *C08J 9/12* (2013.01); *C08G 2101/005* (2013.01); *C08G 2101/0008* (2013.01); *C08G 2101/0083* (2013.01); *C08G 2650/58* (2013.01); *C08J 2375/08* (2013.01); *C08J 2425/12* (2013.01)

(58) Field of Classification Search
CPC ..... C08G 18/63; C08G 18/632; C08G 18/636
See application file for complete search history.

(56) References Cited

U.S. PATENT DOCUMENTS

| | | |
|---|---|---|
| 4,513,124 A | 4/1985 | Hoffman |
| 4,588,830 A | 5/1986 | Fisk |
| 4,640,935 A | 2/1987 | Fisk |
| 4,745,153 A | 5/1988 | Hoffman |
| 4,997,857 A | 3/1991 | Timberlake |
| 5,081,180 A | 1/1992 | Bourguignon |
| 5,196,476 A | 3/1993 | Simroth |
| 5,594,066 A * | 1/1997 | Heinemann ......... C08F 290/062 252/182.25 |
| 5,854,386 A | 12/1998 | Shen |
| 5,990,185 A | 11/1999 | Fogg |
| 6,013,731 A | 1/2000 | Holeschovsky |
| 6,613,827 B2 | 9/2003 | Lungard |
| 7,160,975 B2 | 1/2007 | Adkins |
| 7,179,882 B2 | 2/2007 | Adkins |
| 7,759,423 B2 | 7/2010 | Chauk |
| 7,776,969 B2 | 8/2010 | Adkins |
| 2004/0266958 A1 | 12/2004 | Borst |
| 2005/0085613 A1 | 4/2005 | Adkins |
| 2007/0060690 A1 | 3/2007 | Adkins |
| 2007/0254973 A1 * | 11/2007 | Emge ................. C08G 18/4072 521/170 |
| 2008/0071056 A1 * | 3/2008 | Borst ................... C08F 283/00 528/44 |
| 2009/0209671 A1 * | 8/2009 | Emge ................. C08G 18/4072 521/98 |
| 2009/0281206 A1 | 11/2009 | Van der Wal |
| 2013/0131205 A1 * | 5/2013 | Fennis ................... C08F 2/005 521/163 |

FOREIGN PATENT DOCUMENTS

| | | | |
|---|---|---|---|
| EP | 786480 A | 9/1997 | |
| EP | 1675885 B | 3/2008 | |
| WO | 1999/031160 A | 6/1999 | |
| WO | WO 03097710 A1 * | 11/2003 | .......... C08F 290/062 |
| WO | 2009/155427 A | 12/2009 | |
| WO | 2012/017016 A | 2/2012 | |

* cited by examiner

*Primary Examiner* — Melissa A Rioja

(57) ABSTRACT

Polymer polyols are made by polymerizing an ethylenically unsaturated monomer in a continuous polyol phase. The polymerization is stabilized with a macromer or a preformed polymer made by polymerizing or copolymerizing the macromer. The macromer is a random polymer of propylene oxide and ethylene oxide in defined ratios, which also contains polymerization carbon-carbon double or triple bond. Polymer polyols made in the process exhibit little viscosity rise when blended with water. Flexible polyurethane foam made from the polymer polyol exhibits excellent hardness, have good surface characteristics and, when pigmented, exhibit good, uniform coloration.

4 Claims, 2 Drawing Sheets

FIGURE 1
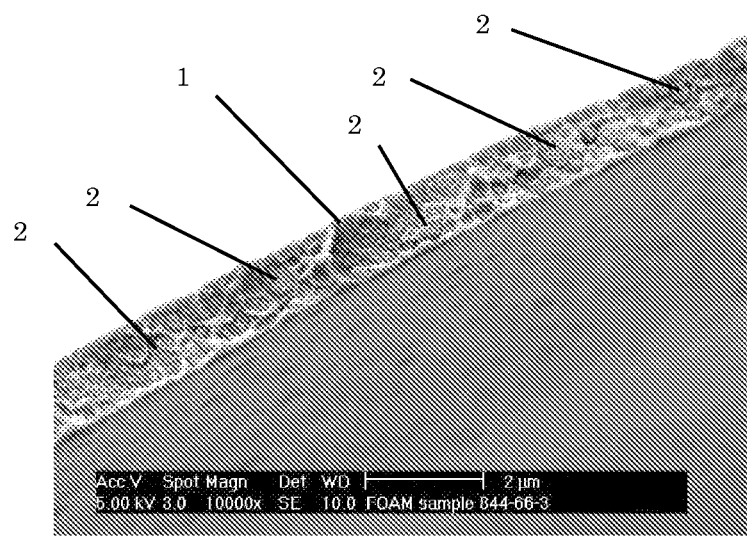
FIGURE 2 (Comparative)
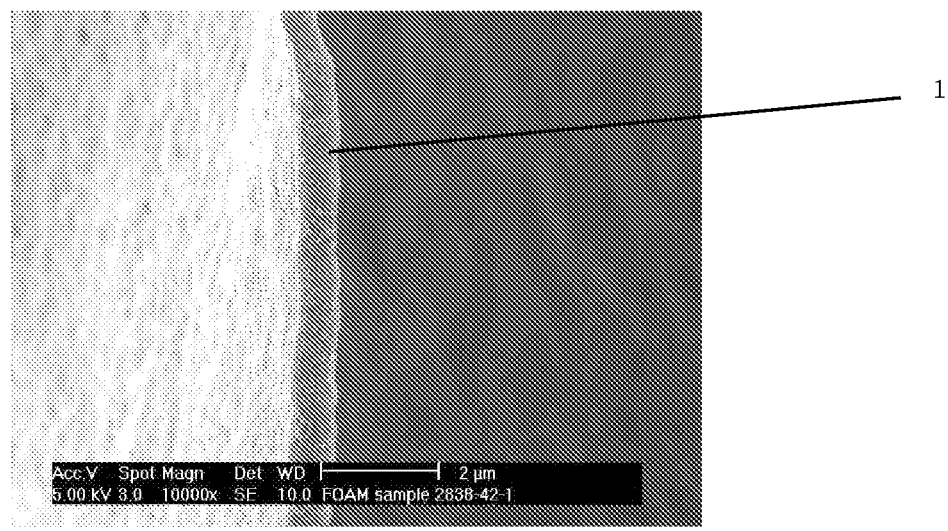

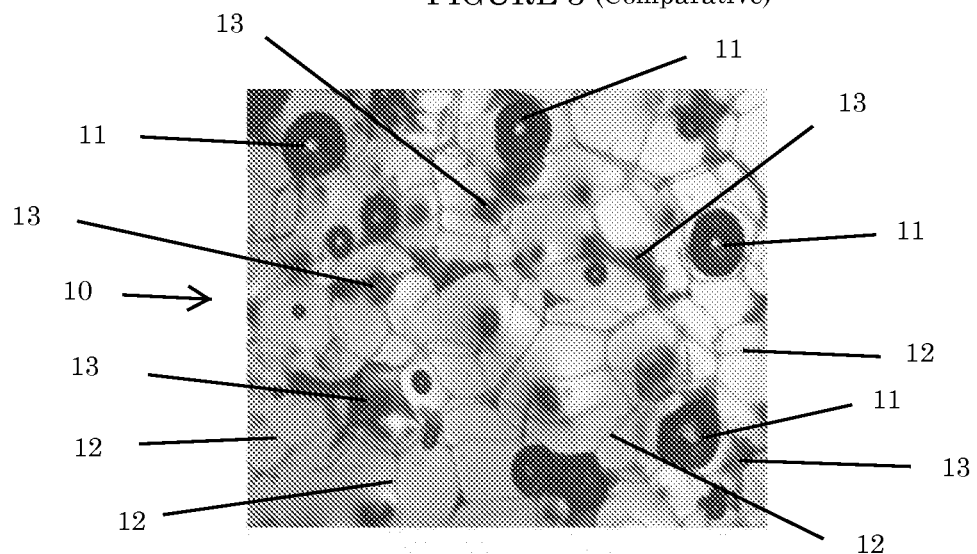
FIGURE 3 (Comparative)
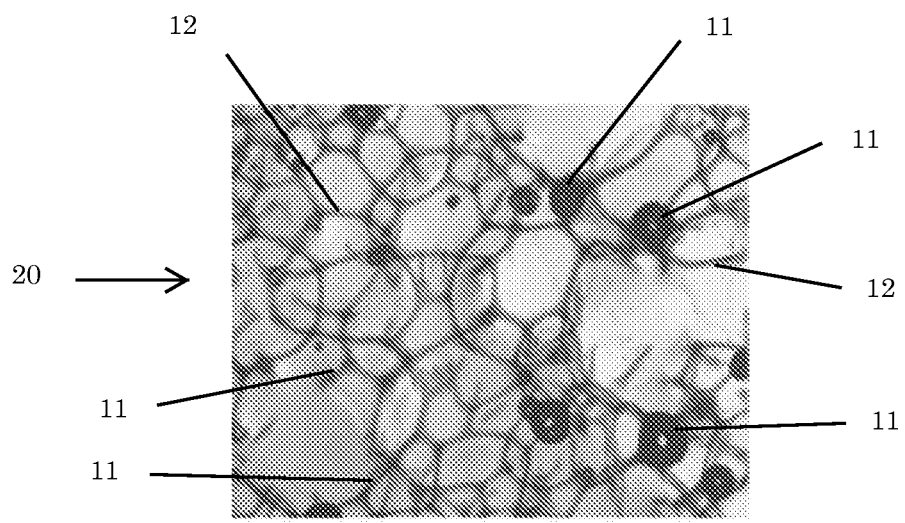
FIGURE 4

MACROMER AND PROCESS FOR MAKING POLYMER POLYOLS

This invention relates to methods for making dispersions of polymer particles in a polyol "Polymer polyols" (sometimes known as "copolymer polyols") are widely used raw materials for manufacturing flexible polyurethane foam, and other polyurethane products. They have a continuous phase made up of one or more compounds having multiple hydroxyl groups (i.e., a "polyol") into which another polymer is dispersed in the form of small particles. The dispersed polymer particles help to form open cells and to increase the load-bearing of polyurethane foam that is made with the polymer polyol.

The conventional way of manufacturing polymer polyols is by polymerizing the disperse phase polymer directly within the continuous polyol phase ("in situ" polymerization). It is also possible to manufacture the polymer polyol in a mechanical dispersion process, in which a preformed polymer is melted and then mechanically dispersed into the polyol phase.

Styrene-acrylonitrile copolymers often form the dispersed phase of these polymer polyol products. The widespread use of styrene-acrylonitrile copolymers is due to several factors. Styrene-acrylonitrile copolymer particles have suitable mechanical and thermal properties. Styrene and acrylonitrile readily copolymerize in a free-radical polymerization at moderate temperatures and pressures, and thus are easily polymerized within a liquid polyol phase. The acrylonitrile is understood to graft to the polyol during the polymerization process. This grafting is believed to be important in forming a stable dispersion. Although styrene homopolymer particles can be formed in a polyol phase, the resulting polymer polyols tend to have poor stability.

Stability is an important characteristic of polymer polyols. The dispersed phase must remain distributed within the polyol phase for extended periods as the polymer polyol is stored, transported and used. In addition, polymer polyol products often experience large swings in temperature during storage and transportation, and must remain stable across the entire temperature range. If the dispersion is unstable, some or all of the dispersed polymer phase can settle out. This leads to fouling of transportation, storage and processing equipment, inconsistencies in the polymer polyol product and inconsistencies in polyurethanes made from the polymer polyol.

Stability is improved through the use of stabilizers. The stabilizer contains polyol-soluble groups, typically polyether chains which can have molecular weights up to several thousand. The stabilizer resides at the surface of the dispersed polymer particles, where the polyol-soluble groups are believed to stabilize the particles through the interaction of these polyol-soluble groups with the continuous polyol phase. One common type of stabilizer is a "macromer" compound, typically a polyether polyol, in which one or more of the hydroxyl groups are capped with a group that contains polymerizable unsaturation. This type of stabilizer copolymerizes with styrene and acrylonitrile, and in doing so introduces polyol-soluble moieties onto the copolymer particles. In some cases the macromer is partially homopolymerized or copolymerized with a small amount of one or more other monomers to form a preformed stabilizer. Examples of macromers and preformed stabilizers of this type are described, for example, in U.S. Pat. Nos. 4,513,124, 4,588,830, 4,640,935, 4,745,153, 4,997,957, 5,081,180, 5,196,476, 5,854,386, 5,990,185, 6,013,731, 6,613,827, 7,160,975, 7,179,882, 7,759,427, 7,776,969, US 2004-0266958, US 2005-0085613, US 2007-0060690, US2009-0281206, EP 0 786 480, EP 1,675,885 and WO 2009/155427.

A macromer frequently described in some of the foregoing references is a capped polyether hexol made by adding propylene oxide and ethylene oxide to sorbitol to form a polyol, and then capping one or more of the terminal hydroxyl groups. Although the macromer by itself is said to be useful as a stabilizer for polymer polyol production, it is typically polymerized to form a pre-formed stabilizer, rather than being used directly. See, e.g., U.S. Pat. Nos. 4,997,857, 7,160,975, 7,759,427, 7,776,969, US 2007-0060690 and US 2009-0289206. When used directly in a batch polymer polyol production process, this macromer has been found to have several shortcomings. Foam hardness (or load-bearing) is sometimes inadequate, especially when the foam has a very low density (less than 20 kg/m$^3$).

Another significant problem with the use of this macromer is that the polymer polyol experiences a rise in viscosity when water is added to it. In some cases, the problem is so pronounced that a thixotropic, self-supporting, mayonnaise-like mass forms. The viscosity rise is believed to be due to the aggregation of the dispersed polyol particles in the presence of water. Particle agglomeration leads to non-homogeneous distribution of the particles throughout the foaming reaction mixture, which in turn leads to non-uniform expansion and curing. The result is that the foam exhibits severe cosmetic and/or structural defects, such as uneven density throughout the foam structure, a roughened, uneven surface, and even splitting.

A third problem exists when the foam is colored, as is often the case. Coloring is done by adding pigments into the foam formulation. It has been found that certain pigments that are otherwise entirely satisfactory perform poorly the polymer polyol is made using this macromer. The coloration is not distributed evenly throughout the foam structure, which leads to less color development (i.e., a generally lighter color) that often is often includes localized darker spots.

Applicants have surprisingly found that the performance of the copolymer polyol in making polyurethane foam, especially water-blown polyurethane foam, is highly dependent on the proportion of ethylene oxide in the polyether portion of the macromer molecule, as well as the manner in which it is incorporated into the polymer chain. When the ethylene oxide is incorporated in the form of internal or terminal blocks, the resulting copolymer polyol exhibits unexpectedly low hardness, increases significantly in viscosity upon the addition of water, and has poor pigment stability. Unexpectedly, very significant improvements are seen when the ethylene oxide is polymerized randomly in specific proportions.

Accordingly, in one aspect, this invention is a process for making a polymer polyol, comprising polymerizing one or more low molecular weight ethylenically unsaturated monomers that have a molecular weight of no greater than 150 in a continuous liquid polyol phase and in the presence of a stabilizer to form a dispersion of solid polymer particles in the continuous liquid polyol phase, wherein the stabilizer includes 1.5 to 15%, based on the weight of the low molecular weight ethylenically unsaturated monomer(s), of (i) a macromer, the macromer being a random copolymer of a mixture of 80 to 95% by weight propylene oxide and 5 to 20% ethylene oxide, the macromer having a number average molecular weight of 6000 to 25,000, 3 to 8 hydroxyl groups per molecule and at least one polymerizable carbon-carbon double or triple bond, (ii) a pre-formed polymer formed by polymerizing a carbon-carbon double or triple bond of such macromer, or (iii) a mixture of (i) and (ii).

The invention is also a polymer polyol comprising a continuous polyol phase, a disperse phase of polymer particles, and a stabilizer, wherein the stabilizer includes 1.5 to 15%, based on the weight of the disperse phase of polymer particles, of (i) a macromer, the macromer being a random copolymer of a mixture of 80 to 95% by weight propylene oxide and 5 to 20% ethylene oxide, the macromer having a number average molecular weight of 6000 to 25,000, 3 to 8 hydroxyl groups per molecule and at least one polymerizable carbon-carbon double or triple bond, or a residue thereof grafted onto the polymer particles, (ii) a pre-formed polymer formed by polymerizing a carbon-carbon double or triple bond of such macromer or a residue of such pre-formed polymer grafted onto the polymer particles or (iii) a mixture of (i) and (ii).

FIG. 1 is a micrograph of a polyurethane foam made in accordance with the invention.

FIG. 2 is a micrograph of a comparative polyurethane foam made using a comparative polymer polyol.

FIG. 3 is a micrograph of a pigmented polyurethane foam made using a comparative polymer polyol.

FIG. 4 is a micrograph of a pigmented comparative polyurethane foam made in accordance with the invention.

In certain embodiments the stabilizer includes an unsaturated macromer. The macromer is a random copolymer of 80 to 95% by weight propylene oxide and 5 to 20% ethylene oxide. For purposes of this invention, a copolymer of propylene oxide and ethylene oxide is considered to be "random" if the propylene oxide and ethylene oxide are provided to the polymerization in the aforementioned proportions and polymerized simultaneously. The macromer preferably is a polymer of a mixture of 84 to 90% by weight propylene oxide and 10 to 16% by weight ethylene oxide.

The macromer has a molecular weight of 6,000 to 25,000, preferably 8,000 to 15,000 and more preferably 11,000 to 14,000. Macromer molecular weights can be determined using gel permeation chromatography methods.

The macromer contains 3 to 8 hydroxyl groups per molecule, preferably 4 to 7 hydroxyl groups per molecule and still more preferably 4 to 5 hydroxyl groups per molecule.

The macromer is unsaturated, by which it is meant the macromer contains at least one polymerizable carbon-carbon double or triple bond. By "polymerizable", it is meant that the double or triple bond can polymerize with carbon-carbon double or triple bonds of other molecules (including the low molecular weight ethylenically unsaturated monomers described herein) to form a polymer. The polymerizable unsaturated group preferably is a carbon-carbon double bond. The macromer preferably has an average of 1 to 2, more preferably 1 to 1.5 polymerizable carbon-carbon double or triple bonds per molecule.

In specific embodiments, the macromer is a random copolymer of a mixture of 84 to 90% by weight propylene oxide and 10 to 16% by weight ethylene oxide, having a molecular weight of 8,000 to 15,000 and more preferably 11,000 to 14,000, which contains 4 to 6 hydroxyl groups per molecule and 1 to 1.5 polymerizable unsaturated groups per molecule. In other specific embodiments, the macromer is a random copolymer of a mixture of 85 to 90% by weight propylene oxide and 10 to 15% by weight ethylene oxide, having a molecular weight from 10,000 to 15,000, which contains 4 to 5 hydroxyl groups per molecule and 1 to 1.5 polymerizable unsaturated groups per molecule.

The macromer can be prepared in either of two main methods. One method can be generally described as forming a random copolymer of propylene oxide and ethylene oxide, having about 3 to 8 hydroxyl groups, and a molecular weight from about 5,950 to 24,950, and "capping" one or more of the hydroxyl groups with a capping agent having polymerizable unsaturation. The capping agent and the starting random copolymer preferably are reacted in a ratio of about 0.05 to about 1.0 mole, preferably from 0.25 to 0.9 mole, more preferably from 0.4 to 0.8 mole, of capping agent per mole of starting copolymer. Using a stoichiometric excess of the starting random copolymer in the capping reaction helps to minimize the proportion of molecules that become capped with two or more of the capping groups. The capping reaction is preferably performed under conditions that promote even distribution of the capping agent, such as, for example, by adding the capping agent to the random copolymer, agitating the reactants as they are mixed, and the like. The result of this capping reaction is a mixture of the macromer and an unreacted portion of the random copolymer.

The capping agent includes, in addition to the polymerizable unsaturation, a functional group that can react with a hydroxyl group of the polyether (or a corresponding alkoxide ion) to form a covalent bond to the polyether. The capping agent may be, for example, an ethylenically unsaturated isocyanate compound such as 3-isopropenyl-α,α-dimethylbenzylisocyanate (TMI) or isocyanatoethylmethacrylate (IEM), an ethylenically unsaturated halide such as vinyl benzyl chloride, and ethylenically unsaturated siloxane such as vinyltrimethoxylsilane, or an ethylenically unsaturated epoxide compound.

3-isopropenyl-α,α-dimethylbenzylisocyanate (TMI) is a highly preferred capping agent. In especially preferred embodiments, the macromer is a random copolymer of 85 to 90% by weight propylene oxide and 10 to 15% by weight ethylene oxide having a molecular weight from 10,000 to 15,000, capped with 3-isopropenyl-α,α-dimethylbenzylisocyanate. This especially preferred macromer preferably is capped with 0.4 to 0.8 3-isopropenyl-α,α-dimethylbenzylisocyanate groups/molecule and has, after capping, 4 to 6, especially 4 to 5, hydroxyl groups per molecule.

An alternative route to making the macromer is to alkoxylate a compound that contains a polymerizable carbon-carbon double or triple bond and one or more oxyalkylatable groups. Examples of such ethylenically unsaturated compounds include ethylenically unsaturated alcohols, thiols or amines. Synthetic routes of this type are described, for example, in U.S. Pat. No. 5,854,396 and in EP 1 675 885 B1. The alkoxylation is performed with a mixture of ethylene oxide and propylene oxide in proportions as described before. A branching agent such as glycidol is included in the alkoxylation reaction, generally by introducing the branching agent is introduced early in the alkoxylation reaction and then continuing the alkoxylation reaction without adding more of the branching agent.

In the process of this invention, one or more low molecular weight ethylenically unsaturated monomers that have a molecular weight of no greater than 150 are polymerized in a continuous liquid polyol phase and in the presence of a stabilizer as described herein. From 1.5 to 15% by weight of the stabilizer of the invention are present, based on the weight of the low molecular weight monomers. A preferred amount is from 2 to 10% by weight and a still more preferred amount is 2 to 8% by weight, based on the weight of the low molecular weight monomers.

In some embodiments, the stabilizer includes a preformed polymer of such a macromer. Such a pre-formed polymer may be formed by homopolymerizing the macromer, or by copolymerizing the macromer with one or more other ethylenically unsaturated monomers having a molecular weight of up to 150. The preformed polymer may have a number average molecular weight from 30,000 to 500,000 and an average of 1 to 20 pendant polyether chains per molecule. It may be a block or random copolymer of the macromer and one or other ethylenically unsaturated monomers having a molecular weight of up to 150.

A useful comonomer for making the pre-formed polymer of the macromer is styrene, although other vinyl aromatic monomers such as acrylate esters, methacrylate esters, acrylonitrile and the like are suitable. The amount of low molecular weight monomer may range from, for example 0.1 to 10 parts by weight per part by weight of macromer, and more preferably from 1 to 5 parts by weight per part by weight of macromer.

The polymerization or copolymerization of the macromer unsaturated polyether may be performed in a free-radical polymerization, including in a "controlled radical polymerization", by which is meant a living free-radical polymerization process characterized in that a dynamic equilibrium between propagating radicals and dormant species is established, allowing radicals to become reversibly trapped. Various types of controlled radical polymerizations are known including, for example, cobalt-mediated radical polymerization (CMPR), stable free radical mediated polymerization (SFRMP) (including, for example, a nitroxide-mediated polymerization (NMP)), atom transfer radical polymerization (ATRP) and reversible addition fragmentation chain transfer (RAFT). Preferred processes are the RAFT and nitroxide-mediated polymerization processes.

The polymerization of the macromer can be performed in bulk, but may instead be performed as a mixture or dispersion in a carrier. The carrier may constitute up to about 80%, preferably from about 20 to 80% and more preferably from about 50 to 80%, of the combined weight of the carrier, macromer and low molecular weight monomers. The carrier material may include, for example, a polyether polyol such as, for example, an uncapped portion of the random copolymer used in preparing the macromer.

Alternatively or in addition, the carrier may include one or more low molecular weight compounds having a molecular weight of about 250 or less, which are not polyethers, and which are solvents for the low molecular weight monomer(s). Suitable carriers of this type include aromatic hydrocarbons such as toluene or xylene, aliphatic hydrocarbons such as hexane, monoalcohols such as ethanol and isopropanol, and ketones such as acetone. If a low molecular weight non-polyether is used as all or part of the carrier, it should be removed before, during or after the time that the pre-formed polymer is used to make the polymer polyol. Similarly, residual monomers and other volatile polymerization by-products can be removed from the pre-formed polymer before, during or after the time the polymer polyol is prepared. These materials can be removed by subjecting the pre-formed polymer or the polymer polyol to reduced pressures and/or elevated temperatures, or by various other stripping methods.

Additional stabilizers can be present, in addition to the macromer and/or pre-formed polymer of this invention. However, it is preferred that the macromer or pre-formed polymer thereof constitute at least 50%, preferably at least 75%, more preferably at least 90% of the total weight of all stabilizers. The macromer and/or pre-formed polymer may be the only stabilizer(s) present. An advantage of this invention is that very good results are achieved when the macromer is used as the stabilizer without prior polymerization. Therefore, in preferred embodiments, the macromer is not formed into a pre-formed polymer, and the macromer constitutes at least 50%, at least 75%, at least 95% of the weight of all the stabilizers. It may constitute up to 100% of the weight of all stabilizers.

The polymer polyol in certain aspects of the invention is prepared by polymerizing one or more low molecular weight (up to 150 g/mol) ethylenically unsaturated monomers in the presence of a liquid polyol phase and a stabilizer as described above. Suitable methods of performing such in situ polymerizations includes those described, for example, in U.S. Pat. Nos. 4,513,124, 4,588,830, 4,640,935, 5,854, 386, 4,745,153, 5,081,180, 6,613,827 and EP 1 675 885. In general, these methods include dispersing the low molecular weight monomer(s) in the form of droplets in a polyol and in the presence of the stabilizer, and subjecting the dispersed monomer droplets to polymerization conditions until the monomer droplets are converted to solid polymer particles dispersed in a continuous polyol phase.

Examples of useful low molecular weight monomers include, for example, aliphatic conjugated dienes such as butadiene and isoprene; monovinylidene aromatic monomers such as styrene, α-methyl styrene, t-butyl styrene, chlorostyrene, cyanostyrene and bromostyrene; α,β-unsaturated carboxylic acids, and esters or anhydrides thereof such as acrylic acid, methacrylic acid, methyl methacrylate, ethyl acrylate, 2-hydroxyethyl acrylate, butyl acrylate, itaconic acid, maleic anhydride and the like; α,β-unsaturated nitriles and amides such as acrylonitrile, methacrylonitrile, acrylamide, methacrylamide, N,N-dimethyl acrylamide, N-(dimethylaminomethyl) acrylamide and the like; vinyl esters such as vinyl acetate, vinyl ethers, vinyl ketones, vinyl and vinylidene halides, and the like. Monovinylidene aromatic monomers such as styrene, and ethylenically unsaturated nitriles such as acrylonitrile are preferred. Especially preferred are mixtures of styrene and acrylonitrile; such a mixture may contain, for example, 50 to 90% by weight styrene and 10 to 50% by weight acrylonitrile.

The polyol that forms the continuous phase in the polymer polyol product is an organic material or mixture of organic materials that is a liquid at room temperature (25° C.) and which contains an average of at least 1.5 isocyanate-reactive groups per molecule. For purposes of this invention, the term "polyol" is used as a shorthand term for such materials, even though the actual isocyanate-reactive groups in a particular case may not necessarily be hydroxyl groups. The liquid polyol preferably contains an average of 1.8 to 8 isocyanate-reactive groups/molecule, especially from 2 to 4 such groups. The isocyanate-reactive groups are preferably aliphatic hydroxyl, aromatic hydroxyl, primary amino and/or secondary amino groups. Hydroxyl groups are preferred. Hydroxyl groups are preferably primary or secondary hydroxyl groups.

The equivalent weight of the polyol per isocyanate-reactive groups will depend on the intended applications. Polyols having an equivalent weight of 400 or greater, such as from 400 to 3000, are preferred for forming elastomeric polyurethanes such as slabstock or molded polyurethane foams, microcellular polyurethane elastomers and non-cellular polyurethane elastomers. Lower equivalent weight polyols, such as those having an equivalent weight of 31 to 399, are preferred for making rigid polyurethane foams and structural polyurethanes.

Preferred types of liquid polyol(s) include polyether polyols, polyester polyols, and various types of polyols that are prepared from vegetable oils or animal fats.

Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers; random copolymers of propylene oxide and ethylene oxide in which the poly(ethylene oxide) content is, for example, from about 1 to about 30% by weight; ethylene oxide-capped poly(propylene oxide) polymers; and ethylene oxide-capped random copolymers of propylene oxide and ethylene oxide. The polyether polyols may contain low levels of terminal unsaturation (for example, less that 0.02 meq/g or less than 0.01 meq/g). Examples of such low unsaturation polyether polyols include those made using so-called double metal cyanide (DMC) catalysts, as described for example in U.S. Pat. Nos. 3,278,457, 3,278,458, 3,278,459, 3,404,109, 3,427,256, 3,427,334, 3,427,335, 5,470,813 and 5,627,120. Polyester polyols typically contain about 2 hydroxyl groups per molecule and have an equivalent weight per hydroxyl group from about 400 to 1500.

Suitable polyesters include reaction products of polyols, preferably diols, with polycarboxylic acids or their anhydrides, preferably dicarboxylic acids or dicarboxylic acid anhydrides. Other suitable polyesters include polymers of cyclic lactones such as polycaprolactone.

Suitable polyols prepared from vegetable oils and animal fats include for example, hydroxymethyl group-containing polyols as described in WO 04/096882 and WO 04/096883; castor oil, so-called "blown" vegetable oils, and polyols prepared by reacting a vegetable oil with an alkanolamine (such as triethanolamine) to form a mixture of monoglycerides, diglycerides, and reaction products of the fatty acid amides, which are ethoxylated to increase reactivity and to provide a somewhat more hydrophilic character. Materials of the last type are described, for example in GB1248919.

Suitable low equivalent weight polyols include materials containing from 2 to 8, especially from 2 to 6 hydroxyl, primary amine or secondary amine groups per molecule and having an equivalent weight from 30 to about 200, especially from 50 to 125. Examples of such materials include diethanol amine, monoethanol amine, triethanol amine, mono-di- or tri(isopropanol)amine, glycerin, trimethylol propane, pentaerythritol, sorbitol, ethylene glycol, diethylene glycol, 1,2-propylene glycol, dipropylene glycol, tripropylene glycol, ethylene diamine, phenylene diamine, bis(3-chloro-4-aminophenyl)methane and 2,4-diamino-3,5-diethyl toluene.

In the polymerization, the amount of low molecular weight monomers may range from 5 to 65%, preferably 15 to 55% and more preferably from 35 to 50% by weight of all components of the reaction mixture. The "solids" of the product, i.e. the weight percentage of solid polymer particles in the product, is in general considered to be the same as the weight percentage of low molecular weight monomers present in the polymerization process, assuming essentially complete (95% or more) conversion of monomers to polymer, which is typical. The polyol(s) that form the continuous polyol phase may constitute 10 to 94%, preferably 30 to 70%, more preferably 40 to 60% by weight, based on the weight of the product.

Various other ingredients may be present during the polymer polyol production process, in addition to the polyol(s), low molecular weight monomer(s) and stabilizer(s). A polymerization catalyst preferably is present. The polymerization catalyst preferably is a free radical initiator that generates free radicals under the conditions of the polymerization process. Examples of suitable free-radical initiators include, for example, peroxy compounds such as peroxides, persulfates, perborates, percarbonates, azo compounds and the like. Specific examples include hydrogen peroxide, di(decanoyl)peroxide, dilauroyl peroxide, t-butyl perneodecanoate, 1,1-dimethyl-3-hydroxybutyl peroxide-2-ethyl hexanoate, di(t-butyl)peroxide, t-butylperoxydiethyl acetate, t-butyl peroctoate, t-butyl peroxy isobutyrate, t-butyl peroxy-3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azo bis(isobutyronitrile), 2,2'-azo bis(2-methylbutyronitrile) and the like. Two or more catalysts may be used. The amount of catalyst may range from 0.01 to 5%, preferably 0.0.1 to 3% by weight, based on the weight of the low molecular weight monomer(s).

A molecular weight regulator such as a chain transfer agent is another useful ingredient. Examples of these include low molecular weight aliphatic alcohols such as isopropanol, ethanol and t-butanol; toluene; ethylbenzene; certain tertiary amines such as triethylamine; mercaptans such as dodecylmercaptan and octadecylmercaptan; and chlorinated alkanes such as carbon tetrachloride, carbon tetrabromine, chloroform, methylene chloride and the like. These materials are typically present (if used at all) in amounts ranging from 0.01 to 3%, preferably 0.25 to 2%, based on the weight of the low molecular weight monomers.

It is often beneficial to provide seed particles in the polymerization. The seed particles are solid particles of an organic polymer; the organic polymer most preferably is a polymer of one or more of the same low molecular weight monomers used in the polymerization. The seed particles may have any convenient particle size up to the target particle size for the polymerization. The seed particles are most conveniently provided in the form of a dispersion of the particles in a polyol phase. Such a dispersion can be specially made. However, a seed dispersion can be simply a portion of a previously made polymer polyol, such as, for example, a portion of a previously made batch of the same polymer polyol product. In industrial batch or semi-batch processes, a reactor "heel", i.e., a small portion of a previously made batch of copolymer polymer that remains in the reaction vessel after removal of the product, is a useful source of seed particles. The seed particles preferably constitute up to 5%, preferably up to 2% and more preferably up to 1%, of the weight of the product polymer polyol. If the seed particles are provided in the form of a seed dispersion, the seed dispersion may constitute up to 10%, preferably up to 5% and more preferably up to 3% of the total weight of the product polymer polyol.

The polymerization typically is performed at an elevated temperature, below the temperature at which any of the polyol(s) and/or low molecular weight monomers boils, typically from 80 to 200° C., more typically 100 to 140° C., still more typically from 110 to 130° C. The polymerization temperature may be selected in conjunction with the selection of free radical initiator, so the free radical initiator decomposes to produce free radicals at the polymerization temperature.

The polymerization typically is performed under agitation, to keep the low molecular weight monomers dispersed in the form of small droplets in the polyol phase until they have polymerized to form solid particles. The polymerization is continued until solid polymer particles are formed and preferably until at least 90%, more preferably at least 95% by weight of the low molecular weight monomers have become converted to polymer. During the polymerization, the macromer and/or pre-formed polymer thereof may in some cases copolymerize with the low molecular weight monomer(s) to graft the macromer or pre-formed polymer thereof to the dispersed polymer particles.

The polymerization can be performed continuously, or in various batch and semi-batch processes. A continuous process is characterized by the continuous introduction of polyol(s), stabilizer, and low molecular weight monomers into the polymerization, and continuous withdrawal of product. In a semi-batch process, at least a portion of the low molecular weight monomers is continuously or intermittently introduced into the polymerization, but product is not continuously withdrawn, preferably not being removed until the polymerization is completed. In the semi-batch process, some or all of the polyol(s) and/or stabilizer may be added continuously or intermittently during the process, but the entire amounts of those materials may instead be charged to the polymerization apparatus prior to the start of the polymerization. In a batch process, all polyol(s), stabilizer(s) and low molecular weight monomers are charged at the beginning of the polymerization, and product is not removed until the polymerization is completed.

The stabilizers described herein have been found to be particularly useful in semi-batch and batch processes. In such semi-batch and batch processes, a particularly useful stabilizer is a macromer which is a random copolymer of a mixture of 85 to 90% by weight propylene oxide and 10 to 15% by weight ethylene oxide having a molecular weight from 10,000 to 15,000, and which contains 4 to 6 or especially 4 to 5 hydroxyl groups per molecule and 1 to 2, especially 1 to 1.5, polymerizable carbon-carbon double or triple bonds.

After the polymerization is completed, the product may be subjected to operations such as the removal of volatiles (such as residual monomers and/or other low molecular weight materials). Volatiles can be removed, for example by heating and/or subjecting the product to subatmospheric pressures.

Polymer polyols of the invention may contain 5 to 65%, preferably 15 to 55% and more preferably from 35 to 50% by weight of dispersed polymer particles. In general, the amount of dispersed polymer particles in the product is taken to be the same as the amount of low molecular weight monomers used in the polymer polyol production process. The size of the dispersed thermoplastic polymer particles may be from about 100 nanometers to 100 microns in diameter, with a preferred minimum particle size being at least 250 nanometers, a preferred maximum particle size being 20 microns and an more preferred particle size being from 250 nanometers to 20 microns and an especially preferred particle size being from 500 nanometers to 3 microns. An advantage of this invention is that somewhat larger amounts of stabilizer can be used in this invention without leading to a large increase in viscosity when water is added to the product. Because larger amounts of stabilizer can be used, better stabilization of the monomer droplets is seen, which leads to smaller particle sizes. Smaller particle size may relate to improvements in reinforcing efficiency (as manifested by foam hardness normalized to density) that are often seen when the polymer polyol of the invention is used to manufacture flexible polyurethane foam.

The macromer and/or pre-formed polymer of the macromer (which my be grafted to the dispersed polymer particles) may constitute 0.25 to 10%, preferably from 0.5 to 8% and more preferably from 0.5 to 5% based on the weight of the product. The polyol(s) that form the continuous polyol phase may constitute 10 to 94%, preferably 30 to 70%, more preferably 40 to 60% by weight, based on the weight of the product.

The polymer polyol is useful to make a wide variety of polyurethane and/or polyurea products. The polyurethane and/or polyurea products will be in most instances elastomeric materials that may be non-cellular, microcellular or foamed. Polyurethanes are typically prepared by reacting the polymer polyol or dispersion with a polyisocyanate. The polymer polyol product may be blended with one or more additional polyols, including those types described above, to adjust the solids content to a desired level or provide particular characteristics to the polyurethane. The reaction with the polyisocyanate is performed in the presence of a blowing agent or gas when a cellular product is desired. The reaction may be performed in a closed mold, but in some applications, such as slabstock foam, the reaction mixture is generally permitted to rise more or less freely to form a low density foam material. Generally, the polymer polyol of the invention can be used in the same manner as conventional polymer polyol materials, using the same general types of processes as are used with the conventional materials.

Suitable polyisocyanates include aromatic, cycloaliphatic and aliphatic isocyanate. Exemplary polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl) cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

The amount of polyisocyanate used in making a polyurethane is commonly expressed in terms of isocyanate index, i.e., 100 times the ratio of NCO groups to isocyanate-reactive groups in the reaction mixture (including those provided by water if used as a blowing agent). In general, the isocyanate index may range as low as 60 and as high as 500 or more. However, for the production of conventional slabstock foam, the isocyanate index typically ranges from about 95 to 140, especially from about 105 to 115. In molded and high resiliency slabstock foam, the isocyanate index typically ranges from about 50 to about 150, especially from about 85 to about 110.

A catalyst is often used to promote the polyurethane-forming reaction. The selection of a particular catalyst package may vary somewhat with the particular application, the particular polymer polyol or dispersion that is used, and the other ingredients in the formulation. The catalyst may catalyze the "gelling" reaction between the polyol(s) and the polyisocyanate and/or, in many polyurethane foam formulation(s), the water/polyisocyanate (blowing) reaction which generates urea linkages and free carbon dioxide to expand the foam. In making water-blown foams, it is typical to use a mixture of at least one catalyst that favors the blowing reaction and at least one other that favors the gelling reaction.

A wide variety of materials are known to catalyze polyurethane-forming reactions, including tertiary amines, tertiary phosphines, various metal chelates, acid metal salts, strong bases, various metal alcoholates and phenolates and metal salts of organic acids. Catalysts of most importance are tertiary amine catalysts and organotin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the high equivalent weight polyol.

When forming a foam, the reaction of the polyisocyanate and the polyol component is conducted in the presence of a blowing agent. Suitable blowing agents include physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful.

The invention provides particular benefits when used to make water-blown flexible polyurethane foam, i.e., when the blowing agent is water or a mixture of water and a physical blowing agent such as a fluorocarbon, hydrofluorocarbon, hydrochlorocarbon or hydrocarbon blowing agent. Water reacts with isocyanate groups to liberate carbon dioxide and form urea linkages. Typically, about 1 to about 7, especially from about 2.5 to about 5, parts by weight water are typically used per 100 parts by weight of polyols in the foam formulation.

Alternatively or in addition, a gas such as carbon dioxide, air, nitrogen or argon may be used as the blowing agent to produce polyurethane foam in a frothing process. Carbon dioxide can also be used as a liquid or as a supercritical fluid.

A surfactant is also used when a polyurethane foam is prepared. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

In addition to the foregoing components, the polyurethane formulation may contain various other optional ingredients such as cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In general, a polyurethane foam is prepared by mixing the polyisocyanate and polymer polyol in the presence of the blowing agent, surfactant, catalyst(s) and other optional ingredients as desired, under conditions such that the polyisocyanate and polyol react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the high equivalent weight polyol(s) to form a prepolymer, which is in a second step reacted with a chain extender and/or water to form the desired foam. Frothing methods (as described in U.S. Pat. Nos. 3,755,212; 3,849,156 and 3,821,130, for example), are also suitable. So-called one-shot methods (such as described in U.S. Pat. No. 2,866,744) are preferred. In such one-shot methods, the polyisocyanate and all polyisocyanate-reactive components are simultaneously brought together and caused to react. Three widely used one-shot methods which are suitable for use in this invention include slabstock flexible foam processes, high resiliency flexible slabstock foam processes, and molded flexible foam methods.

The advantages of the invention in connection with flexible polyurethane are seen in both the foam manufacturing process itself and in the attributes of the product, especially when the blowing agent is water or a mixture of water and a physical blowing agent such as a fluorocarbon, hydrofluorocarbon, hydrochlorocarbon or hydrocarbon. In such processes, the polymer polyol product is brought into contact with water. Compared to polymer polyols made with certain other macromers as stabilizers, the polymer polyol of this invention exhibits a significantly smaller viscosity increase. This reduces the needed operating pressures to meter, mix and dispense the polymer polyol (or foam formulation containing it), and also facilitates mixing the polymer polyol with other components of the foam formulation. Flexible polyurethane foams made using the polymer polyol of the invention often exhibit surprisingly good load-bearing (at a given foam density). The effect is particularly noticeable in very low density foams in which the foam density is 24 kg/m$^3$ or less, especially 14 to 20 kg/m$^3$. The dispersed polymer particles appear to perform unexpectedly efficiently as reinforcing agents in the polyurethane foam structure. As is shown in the following examples, this may be due to a higher concentration of the dispersed polymer particles in the cell walls of the foam, than is achieved when certain conventional macromers are used as the polymer polyol stabilizer.

Flexible water-blown polyurethane foams made using a polymer polyol of this invention process well, forming a consistent-quality foam with a uniform surface and little propensity to split. In addition, these foams, when pigmented, exhibit uniform coloration and good color development.

The following examples are provided to illustrate the invention, but are not intended to limit the scope thereof. All parts and percentages are by weight unless otherwise indicated.

EXAMPLES

A. Production of Macromer

Potassium hydroxide is added to a sorbitol-initiated poly (propylene oxide) starter polyol having a molecular weight of about 700. Enough of the potassium hydroxide is added to provide about 2100 ppm KOH in the final, 12,000 molecular weight product. The starter polyol corresponds to a reaction product of sorbitol and about 2 moles of propylene oxide/hydroxyl group. An 88/12 mixture of propylene oxide and ethylene oxide is added and allowed to polymerize at a temperature of 105° C. to produce a hexafunctional polyol in which propylene oxide and ethylene oxide are randomly polymerized. The final ratio of propylene oxide and ethylene oxide is about 88.5:11.5 by weight. The final hydroxyl number is 30.1, which corresponds to a hydroxyl equivalent weight of 1864 and a molecular weight of about 11,200. After finishing and addition of 250 ppm antioxidant, 500 parts of this copolymer are heated to 55° C. with stirring and 0.55 moles of TMI (per mole of copolymer) are added. Then 0.05 of a tin catalyst are added, and the mixture is stirred at 55° C. for 120 minutes. The product (Macromer Mixture A) of this reaction is a mixture containing about 50% by weight of a macromer corresponding to the reaction product of TMI and the polyether and about 50% by weight of uncapped polyether. The macromer molecules contain 1-2 polymerizable carbon-carbon double bond per molecule and 4-5 hydroxyl groups per molecule.

Macromer Mixture B is made in the same way, except the hexafunctional polyol is made by sequentially adding propylene oxide and ethylene oxide at a 90/10 weight ratio to the starter polyol. This produces a polyether having terminal poly(ethylene oxide) blocks instead of a random copolymer. After capping with TMI, the resulting product is designated Macromer Mixture B. Macromer Mixture B also contains about 50% by weight of macromer molecules.

B. Preparation of Polymer Polyol

Polymer polyol Example 1 is prepared by charging a stirred reactor with a mixture of 49.61 parts of a base polyol (a 981 hydroxyl equivalent weight, nominally trifunctional copolymer of 88.5% propylene oxide and 11.5% ethylene oxide), 2.5 parts of a previous-formed polymer polyol (the heel of a previous polymerization reaction) and 5 parts of Macromer Mixture A (i.e., about 2.5 parts of the macromer). This mixture is purged with nitrogen and vacuum several times. The internal reactor pressure is brought to 10 kPa and the mixture is then heated to 125° C. Separately, 29.68 parts of styrene, 12.72 parts of acrylonitrile, 0.49 parts of dodecylmercaptan and 0.28 parts of a free radical initiator are homogenized in a small amount of the base polyol. This blend is added to the stirred reactor at a uniform rate over three hours. At the end of the monomer addition, a blend of a second free radical initiator in a small amount of base polyol is added. The reaction temperature is then increased by 5° C. every 30 minutes until a temperature of 145° C. is attained, after which the reactor contents are allowed to react for another 60 minutes. The reactor is then cooled to 40° C. The resulting product is stripped under vacuum. This product is designated Example 1. It contains 43.6% by weight dispersed styrene-acrylonitrile particles and has a viscosity of 4803 centistokes at 25° C.

Comparative Polymer Polyol A is prepared in the same general manner, except Macromer Mixture A is replaced with Macromer Mixture B. The product contains 45% by weight dispersed styrene-acrylonitrile particles hand has a viscosity of 6000 centistokes at 25° C.

Portions of each of Polymer Polyol Example 1 and Comparative Polymer Polyol A are separately blended with various amounts of water. The viscosity (G) of each blend is measured at zero shear and 25° C. on a plate-cone rheometer (50 mm diameter plate, 1° angle, 0.102 mm gap). The viscosity values of both Polymer Polyol Example 1 and Comparative Polymer Polyol A are very similar when blended with zero, 3% and 4% water. At above 4% water, very dramatic increases (nearly three orders of magnitude) in viscosity are seen with Comparative Polymer Polyol A. At 5 and 6% water, this material assumes a mayonnaise-like consistency. Polymer Polyol Example 1, however, exhibits almost no increase in viscosity, even when more than 7% water is added.

C. Preparation of Flexible Polyurethane Foams

Polymer Polyol Example 1 is diluted with enough of a 3500 molecular weight, nominally trifunctional random copolymer of propylene oxide and ethylene oxide to form a polyol blend containing 13.8% dispersed styrene-acrylonitrile particles. 100 parts of this blend are mixed on a high speed mixer with 2 parts of a red pigment, an organosilicone surfactant, an amine catalyst mixture and 3.45 parts water. A tin octoate catalyst is then mixed in, followed by enough of an 80/20 mixture of 2,4-toluene diisocyanate and 2,6-toluene diisocyanate to provide an isocyanate index of 115. This mixture is then poured into an open box and cured for 5 minutes in a 140° C. oven to produce Foam Example 1.

Foam Examples 2-10 are made in the same general manner, using various levels of water and methylene chloride as the blowing agent, as indicated in Table 1 below. Catalyst levels are adjusted in each case to maintain consistent reaction rates.

Comparative Foams C1-C10 are made in an analogous manner, except Comparative Polymer Polyol A replaces Polymer Polyol Example 1 in all cases. Water and methylene chloride levels are as indicted in Table 1.

TABLE 1

| Designation | Water, pphp[1] | MeCl$_2$, pphp[1] | Polymer Polyol |
|---|---|---|---|
| 1 | 3.5 | 0 | Ex. 1 |
| C1* | 3.5 | 0 | Comp. A* |
| 2 | 3.5 | 10 | Ex. 1 |
| C2* | 3.5 | 10 | Comp. A* |
| 3 | 3.5 | 20 | Ex. 1 |
| C3* | 3.5 | 20 | Comp. A* |
| 4 | 3.5 | 30 | Ex. 1 |
| C4* | 3.5 | 30 | Comp. A* |
| 5 | 5.25 | 0 | Ex. 1 |
| C5* | 5.25 | 0 | Comp. A* |
| 6 | 5.25 | 10 | Ex. 1 |
| C6* | 5.25 | 10 | Comp. A* |
| 7 | 5.25 | 20 | Ex. 1 |
| C7* | 5.25 | 20 | Comp. A* |
| 8 | 5.25 | 30 | Ex. 1 |
| C8* | 5.25 | 30 | Comp. A* |
| 9 | 7 | 0 | Ex. 1 |
| C9* | 7 | 0 | Comp. A* |
| 10 | 7 | 30 | Ex. 1 |
| C10* | 7 | 30 | Comp. A* |

*Not an example of the invention.
[1]Pphp is parts by weight per 100 parts by weight polyols.

For each of these foams, density is measured according to ISO 845 and foam hardness is measured according to ISO 3386. Normalized density is calculated by dividing the foam hardness by the density in each case. The density, normalized density and the improvement in normalized density versus the corresponding comparative foam are as reported in Table 2 for each of foam Examples 1-10.

TABLE 2

| Foam Example | Water, pphp[1] | MeCl$_2$, pphp[1] | Density, kg/m$^3$ | Normalized Hardness, kPa/kg/m$^3$ | Corresponding Comparative Foam | % Increase in Normalized Hardness |
|---|---|---|---|---|---|---|
| 1 | 3.5 | 0 | 28.4 | 0.2 | C1 | 10% |
| 2 | 3.5 | 10 | 24.7 | 0.17 | C2 | 13.2% |
| 3 | 3.5 | 20 | 20.6 | 0.16 | C3 | 16.4% |
| 4 | 3.5 | 30 | 19.0 | 0.14 | C4 | 43.9% |
| 5 | 5.25 | 0 | 23.1 | 0.26 | C5 | 18.9% |
| 6 | 5.25 | 10 | 18.6 | 0.22 | C6 | 31.5% |
| 7 | 5.25 | 20 | 15.9 | 0.24 | C7 | 43.7% |
| 8 | 5.25 | 30 | 14.1 | 0.23 | C8 | 47.9% |
| 9 | 7 | 0 | 19.2 | 0.29 | C9 | 17.5% |
| 10 | 7 | 30 | 11.9 | 0.28 | C10 | 1% |

[1]Pphp is parts by weight per 100 parts by weight polyol.

As can be seen from the data in Table 2, very significant improvements in normalized hardness are seen in the foam examples of the invention. The only difference between the inventive foams and the comparative foams is the selection of macromer used in making the polymer polyol component. As the data in Table 2 shows, changing the macromer from a propylene oxide-ethylene oxide block copolymer to a random copolymer (at slightly higher ethylene oxide content) leads to very large and unexpected differences in the load bearing of the foam.

SEM micrographs are taken of a cell wall from a foam of the invention and a cell wall from the corresponding Comparative foam. These micrographs form FIGS. 1 and 2, respectively. In FIG. 1, styrene-acrylonitrile particles 2 are clearly seen in the cell wall 1. However, in FIG. 2 (which depicts the Comparative foam), the styrene-acrylonitrile particles are absent. This indicates a significant difference in the manner that the dispersed styrene-acrylonitrile particles become distributed in the two foams. In the foams of the invention, the particles become distributed throughout the cell walls. This is believed to contribute to the higher load-bearing of the inventive foams. In the comparative foams, the styrene-acrylonitrile particles are believed to become concentrated in the struts rather than cell walls. The relative absence of styrene-acrylonitrile particles in the cell walls is believed to account for the lower load-bearing of these foams.

The foam Examples are seen to have a darker, more consistent coloration than the corresponding Comparative Foams, which are generally lighter in color but have isolated regions of intense color. Micrographs are taken of a Foam Example and a Comparative Foam to evaluate the distribution of the pigment. FIGS. 3 and 4 are representative micrographs of the Comparative Foam and the Foam Example, respectively. In FIG. 3, Foam 10 contains many pigment agglomerates 13. Struts 12 are seen to be at most lightly colored. (The roughly circular dark spots such as those indicated by reference numerals 11 are air bubbles.) The presence of many agglomerates and the absence of pigment in the struts indicates that the pigment has poorly distributed into the polymer structure. The pigment disperses much more evenly into the Foam Example, as shown in FIG. 4. In FIG. 3, foam 20 contains essentially pigment agglomerates. Struts 12 in FIG. 3 are much more richly colored. (Air bubbles are again indicated by reference numerals 11.) This better distribution of the pigment is believed to account for the better visually-observed coloration of the Foam Example.

What is claimed is:

1. A polyurethane foam which is produced by reacting a polymer polyol with an organic polyisocyanate in the presence of a blowing agent, wherein the polymer polyol comprises a continuous polyol phase, a disperse phase of polymer particles, and 1.5 to 15%, based on the weight of the disperse phase of polymer particles, of a stabilizer, wherein the stabilizer includes a mixture or dispersion of a macromer in a carrier, the macromer being a random copolymer prepared by alkoxylating sorbitol with an alkylene oxide mixture that is 88.5% by weight propylene oxide and 11.5% by weight ethylene oxide, said random copolymer is capped with 1-2 isopropenyl-α,α-dimethylbenzylisocyanate groups per molecule, the macromer having a number average molecular weight of 10,000 to 15,000, and wherein the carrier is residual uncapped random copolymer which has not been capped with isopropenyl-α,α-dimethylbenzylisocyanate.

2. The polyurethane foam of claim 1 which is a flexible polyurethane foam, and the blowing agent is water or a mixture of water and a physical blowing agent.

3. The polyurethane foam of claim 2, which has a density of 14 to 20 kg/m$^3$.

4. The polyurethane foam of claim 2, which further contains a pigment.

\* \* \* \* \*